Oct. 29, 1929.   M. W. WUESTHOFF   1,733,521
SHOWER BATH FIXTURE
Filed Nov. 5, 1925
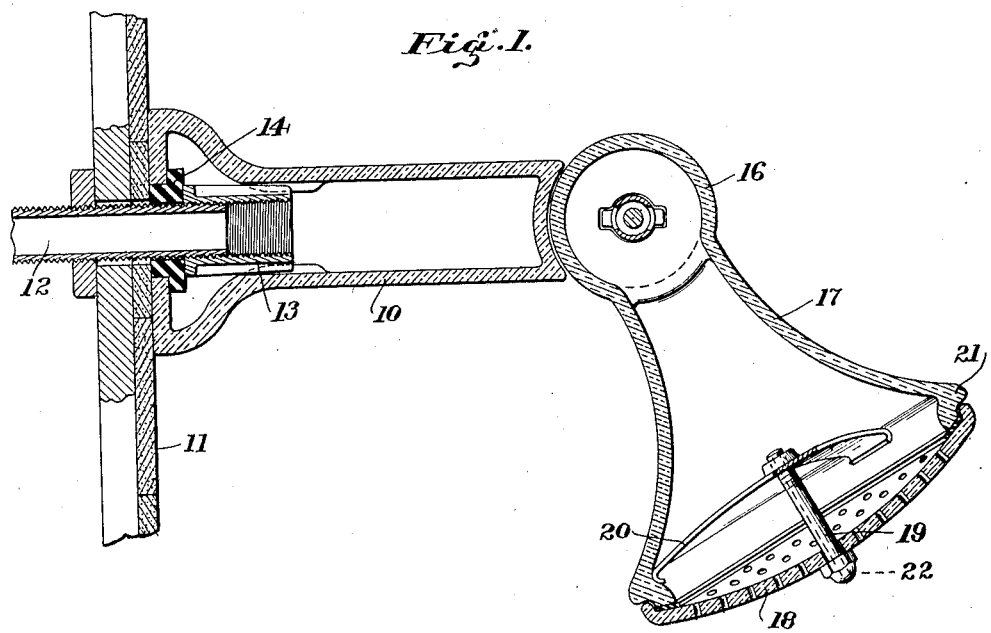
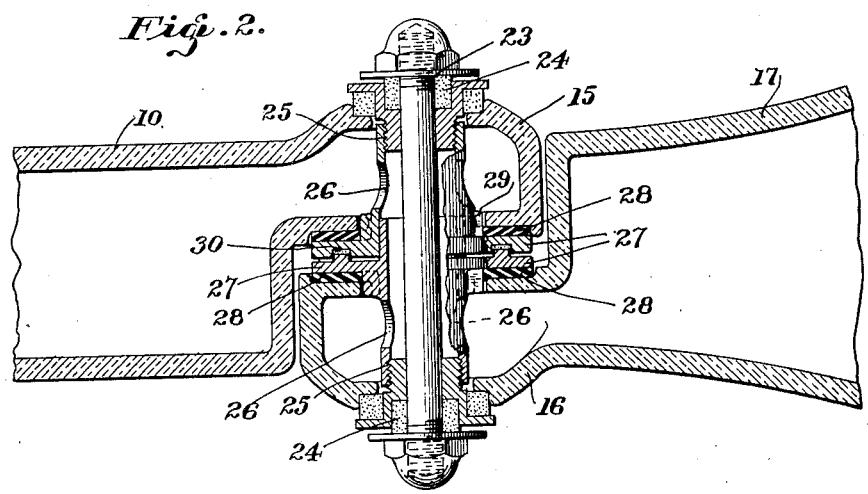
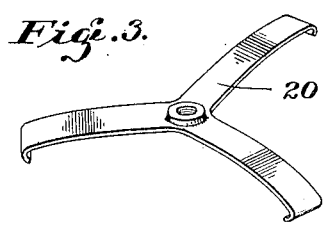
INVENTOR.
Maximilian W. Wuesthoff.
BY Dewey, Strong, Townsend & Loftus
ATTORNEYS.

Patented Oct. 29, 1929

1,733,521

UNITED STATES PATENT OFFICE

MAXIMILIAN W. WUESTHOFF, OF SAN FRANCISCO, CALIFORNIA, ASSIGNOR TO EDWARD T. FOULKES, OF SAN FRANCISCO, CALIFORNIA

SHOWER-BATH FIXTURE

Application filed November 5, 1925. Serial No. 66,989.

This invention relates to shower bath fixtures and has for its object to provide a shower bath fixture capable of being constructed in so far as exposed parts are concerned, of porcelain or china, and wherein the shower head is capable of angular adjustment. The invention includes also the provision of means for connecting the face plate to the shower head so that the same may be quickly and easily detached to facilitate cleaning.

One form which my invention may assume is exemplified in the following description and illustrated in the accompanying drawing, in which Fig. 1 shows a central longitudinal sectional view of the fixture;

Fig. 2 shows a sectional view of a portion of the fixture taken at right angles to Fig. 1;

Fig. 3 shows a detail of one of the parts used in connecting the perforated face plate to the shower head.

The device as herein illustrated comprises a stationary conduit 10 constructed preferably of porcelain. It is adapted to seat against a wall or other supporting surface 11, and to be connected to a supply pipe 12. The connection between the porcelain conduit and the supply pipe includes a metallic sleeve 13 fitted slidably and non-rotatably within the porcelain conduit, and screw-threaded onto the pipe 12 so as to press against a rubber gasket 14. This particular form of connection is similar to the one shown in my Patent Number 1,548,570, issued August 4, 1925.

The outer end of the conduit 10 has a semispherical shoulder 15 co-operating with a similarly shaped shoulder 16 on the shower head proper. This shower head is constructed of porcelain and includes a bell-shaped neck portion 17 and a perforated face plate 18. The face-plate 18 is detachably connected to the bell-shaped portion by means of a bolt 19 threaded onto a spider 20. The spider is of spring material and rests upon a flange 21 formed on the inner edge of the bell-shaped member 17. The bolt 19 is preferably provided with a central duct or bore 22, which serves as a vent.

An important phase of the present invention is the pivotal connection between the shoulder members 15 and 16, whereby the shower head may be moved angularly. This pivotal connection includes a bolt 23 extending through both of the shoulders and provided at its ends with a stuffing box 24, so as to prevent leakage from the interior of the hollow shoulder at these points. Each stuffing box includes a threaded portion 25 extending within the shoulder members, and connected to each of these threaded portions is a transversely perforated, cylindrical member 26. These cylinders are fitted together telescopically at their inner ends, and each is provided with a flange 27 lying adjacent the flat surfaces of the co-operating shoulders. Preferably there is a packing member 28 between each flange 27 and the adjacent shoulder, to prevent leakage, and each cylindrical member is held against rotation within the shoulder by means of interlocking lugs 29.

By tightening the nuts on the bolt 23, the flanges 27 can be pressed tightly together; and likewise the packing members 28 can be compressed. To prevent leakage between the contacting faces of the flanges 27 I may provide suitable packing means 30.

The operation of this pivotal connection is believed to be obvious. It permits of the connection of two hollow porcelain or china members together, so as to allow one to be moved with relation to the other. It is so arranged as to prevent leakage where the metallic parts pass through the porcelain members, and is sufficiently strong and rugged to withstand the strains incident to adjustment of the shower head. The nuts on the bolt 23 can be tightened sufficiently to draw the parts together with enough friction so that the shower head will remain in any of its various positions of adjustment, while at the same time it may be moved without undue effort into different positions.

Various changes in the construction and arrangement of the several parts may be employed, without departing from the spirit of my invention as disclosed in the appended claim.

Having thus described my invention, what I claim as new and desire to secure by Letters Patent is:

In a shower bath fixture, a rigid member adapted to be connected with a supply pipe and forming a conduit for water, said member having a hollow shouldered portion of ceramic material at its end, and another rigid member having a hollow shouldered portion of ceramic material to co-operate with the shoulder on the rigid member, means for pivotally connecting said shouldered members together and to form a communication between them for the passage of water, said pivotal connection including a bolt extending through both shouldered members, transversely perforated cylindrical members of metal within each shoulder and surrounding the bolt, said cylindrical members terminating in flanges on the exterior of the inner faces of the shouldered portions, packing means between each end of the bolt and the adjacent shouldered member, packing means between the flange of each cylinder and the adjacent face of the shouldered member, and packing means between the contacting faces of the flanges.

MAXIMILIAN W. WUESTHOFF.